US008983297B2

(12) United States Patent
Chien et al.

(10) Patent No.: US 8,983,297 B2
(45) Date of Patent: Mar. 17, 2015

(54) MULTI-STAGE OPTICAL INTERLEAVING

(75) Inventors: Hung-Chang Chien, Rockaway, NJ (US); Jianjun Yu, Basking Ridge, NJ (US); Ze Dong, Morristown, NJ (US)

(73) Assignee: ZTE (USA) Inc., Morristown, NJ (US)

( * ) Notice: Subject to any disclaimer, the term of this patent is extended or adjusted under 35 U.S.C. 154(b) by 340 days.

(21) Appl. No.: 13/492,775

(22) Filed: Jun. 8, 2012

(65) Prior Publication Data

US 2012/0321248 A1 Dec. 20, 2012

Related U.S. Application Data

(60) Provisional application No. 61/495,930, filed on Jun. 10, 2011.

(51) Int. Cl.

| | |
|---|---|
| ***H04J 14/02*** | (2006.01) |
| ***G02B 6/26*** | (2006.01) |
| ***H04J 14/00*** | (2006.01) |
| ***H04B 10/516*** | (2013.01) |

(52) U.S. Cl.

CPC . *G02B 6/26* (2013.01); *H04J 14/00* (2013.01); *H04B 10/516* (2013.01); *H04J 14/02* (2013.01)

USPC .......................................................... 398/82

(58) Field of Classification Search

USPC ......................................... 398/42, 43, 48, 82

See application file for complete search history.

(56) References Cited

U.S. PATENT DOCUMENTS

| | | | | |
|---|---|---|---|---|
| 6,587,204 | B2 | 7/2003 | Hsieh | |
| 6,904,240 | B1 * | 6/2005 | Suga et al. | 398/79 |
| 6,947,631 | B2 * | 9/2005 | Arai et al. | 385/24 |
| 7,437,074 | B2 * | 10/2008 | Nakamura et al. | 398/82 |
| 2002/0003643 | A1 * | 1/2002 | Qian et al. | 359/127 |

* cited by examiner

*Primary Examiner* — Dalzid Singh

(74) *Attorney, Agent, or Firm* — Perkins Coie LLP

(57) ABSTRACT

Methods and devices are provided to facilitate production of optical signals that exhibit reduced crosstalk noise and intersymbol interference. In some configurations, a multi-stage optical interleaver, including a first and a second optical interleaver, is used to process a first and a second set of input optical channels. The composite optical output of the multi-stage interleaver includes the first set of optical channels and the second set of optical channels, where each of the first and second set of input optical channels is processed once by the first optical interleaver and once by the second optical interleaver. As such, the first and second sets of input optical channels are each filtered twice using only two optical interleavers.

25 Claims, 6 Drawing Sheets

MULTI-STAGE OPTICAL INTERLEAVING

CROSS REFERENCE TO RELATED APPLICATIONS

This patent application claims the benefit of U.S. Provisional Patent Application No. 61/495,930, filed Jun. 10, 2011. The entire content of the before-mentioned patent application is incorporated by reference as part of the disclosure of this application.

BACKGROUND

This patent document relates to optical communication systems, including techniques for communicating information using wavelength division multiplexing (WDM) techniques.

The single-channel optical transmission rate has been significantly increased in the recent years, as evidenced by the introduction of new technologies and products. In this regard, 100 Gigabit (Gb) Ethernet powered by dual polarization quadrature phase shift keying (DP-QPSK) with digital coherent demodulation will become commercially available soon. However, the industry has reached a point that the speed of electronics, the bandwidth of opto-electronic interfaces, as well as the required optical signal-to-noise ratio (OSNR) at higher modulation levels, all impose significant challenges to further increases in single-channel bit rates to meet the expected network capacity demand at 1 Tb/s and beyond.

SUMMARY

One aspect of the disclosed embodiments relates to a device that includes a first optical interleaver, having a first, a second and a third port, a second optical interleaver, having a first, a second and a third port, and an optical coupler having a first port, a second port and a third port. The device is configured to: receive a first set of input optical channels and a second set of input optical channels, and produce a composite optical output comprising the first set of input optical channels and the second set of input optical channels, where each of the first and second set of input optical channels having been processed once by the first optical interleaver and once by the second optical interleaver. In one exemplary embodiment, each of the first, second and the third ports of the first and the second optical interleavers and each of the first, second and third ports of the optical coupler is configurable for use an input or an output port.

According to an exemplary embodiment, an optical path associated with the first set of input optical channels comprises a path from the second port of the first optical interleaver, to the third port of the first optical interleaver, to the third port of the second optical interleaver, to the second port of the second optical interleaver, to the second port of the optical coupler and to the third port of the optical coupler. In this exemplary embodiment, an optical path associated with the second set of input optical channels comprises a path from the first port of the second optical interleaver, to the third port of the second optical interleaver, to the third port of the first optical interleaver, to the first port of the second optical interleaver, to the first port of the optical coupler and to the third port of the optical coupler.

In an exemplary embodiment, an optical path associated with the first set of input optical channels comprises a path from the first port of the first optical interleaver, to the third port of the first optical interleaver, to the third port of the optical coupler, to the second port of the optical coupler, to the second port of the second optical interleaver and to the third port of the second optical interleaver. In this exemplary embodiment, an optical path associated with the second set of input channels comprises a path from the first port of the optical coupler to the third port of the optical coupler, to the third port of the first optical interleaver, to the first port of the first optical interleaver, to the first port of the second optical interleaver and to the third port of the second optical interleaver. In another exemplary embodiment, the optical coupler is configured to produce a signal at the third port of the optical coupler that is comprised of equal proportions of signals at the first and second ports of the optical coupler.

Another aspect of the disclosed embodiments relates to a device that includes a first optical interleaver, having a first, a second and a third port, a second optical interleaver, having a first, a second and a third port, and a third optical interleaver, having a first, a second and a third port. The device is configured to: receive a first set of input optical channels and a second set of input optical channels, and produce a composite optical output comprising the first set of input optical channels and the second set of input optical channels, where each of the first and second set of input optical channels having been processed once by the first optical interleaver, once by the second optical interleaver and once by the third optical interleaver.

In an exemplary embodiment, an optical path associated with the first set of input optical channels comprises a path from the second port of the first optical interleaver, to the third port of the first optical interleaver, to the third port of the second optical interleaver, to the second port of the second optical interleaver, to the second port of the third optical interleaver and the third port of the third optical interleaver. In this exemplary embodiment, an optical path associated with the second set of input optical channels comprises a path from the first port of the second optical interleaver, to the third port of the second optical interleaver, to the third port of the first optical interleaver, to the first port of the second optical interleaver, to the first port of the third optical interleaver and to the third port of the third optical interleaver.

Another aspect of the disclosed embodiments relates to a method that includes receiving a first set of input optical channels and a second set of input optical channels at a multi-state optical interleaver, where the multi-stage optical interleaver comprises: a first optical interleaver, having a first, a second and a third port, a second optical interleaver, having a first, a second and a third port, and an optical coupler having a first port, a second port and a third port. The method further includes producing a composite optical output comprising the first set of input optical channels and the second set of input optical channels, where each of the first and second set of input optical channels is processed once by the first optical interleaver and once by the second optical interleaver.

According to an exemplary embodiment, each of the first, second and the third ports of the first and the second optical interleavers and each of the first, second and third ports of the optical coupler is configurable for use an input or an output port.

In another exemplary embodiment, producing the composite optical output comprises propagating the first set of optical channels through the multi-stage optical interleaver in accordance with an optical path that comprises a path from the second port of the first optical interleaver, to the third port of the first optical interleaver, to the third port of the second optical interleaver, to the second port of the second optical interleaver, to the second port of the optical coupler and to the third port of the optical coupler. In this exemplary embodiment, producing the composite optical output also comprises propagating the second set of optical channels through the multi-stage optical interleaver in accordance with an optical path that comprises a path from the first port of the second optical interleaver, to the third port of the second optical interleaver, to the third port of the first optical interleaver, to the first port of the second optical interleaver, to the first port of the optical coupler and to the third port of the optical coupler.

In one exemplary embodiment, producing the composite optical output comprises propagating the first set of optical channels through the multi-stage optical interleaver in accordance with an optical path that comprises a path from the first port of the first optical interleaver, to the third port of the first optical interleaver, to the third port of the optical coupler, to the second port of the optical coupler, to the second port of the second optical interleaver and to the third port of the second optical interleaver. In this exemplary embodiment, producing the composite optical output further comprises propagating the second set of optical channels through the multi-stage optical interleaver in accordance with an optical path that comprises a path from the first port of the optical coupler to the third port of the optical coupler, to the third port of the first optical interleaver, to the first port of the first optical interleaver, to the first port of the second optical interleaver and to the third port of the second optical interleaver.

In still another exemplary embodiment, the optical coupler is configured to produce a signal at the third port of the optical coupler that is comprised of equal proportions of signals at the first and second ports of the optical coupler.

Another aspect of the disclosed embodiments relates to a method that includes receiving a first set of input optical channels and a second set of input optical channels at a multi-state optical interleaver, where the multi-stage optical interleaver comprises: a first optical interleaver, having a first, a second and a third port, a second optical interleaver, having a first, a second and a third port, and a third optical interleaver, having a first, a second and a third port. The above noted method further includes producing a composite optical output comprising the first set of input optical channels and the second set of input optical channels, where each of the first and second set of input optical channels is processed once by the first optical interleaver, once by the second optical interleaver and once by the third optical interleaver.

In an exemplary embodiment, producing the composite optical output comprises propagating the first set of optical channels through the multi-stage optical interleaver in accordance with an optical path that comprises a path from the second port of the first optical interleaver, to the third port of the first optical interleaver, to the third port of the second optical interleaver, to the second port of the second optical interleaver, to the second port of the third optical interleaver and the third port of the third optical interleaver. In this exemplary embodiment, producing the composite optical output further comprises propagating the second set of optical channels through the multi-stage optical interleaver in accordance with an optical path that comprises a path from the first port of the second optical interleaver, to the third port of the second optical interleaver, to the third port of the first optical interleaver, to the first port of the second optical interleaver, to the first port of the third optical interleaver and to the third port of the third optical interleaver.

Another aspect of the disclosed embodiments relates to a device that can be used for interleaving different optical channels at different optical wavelengths. Such a device includes a first optical interleaver, having a first, a second and a third port, to route a set of first optical channels between the first and third ports while providing optical filtering of each first optical channel. The device also includes a second optical interleaver, having a first, a second and a third port, to route a set of second optical channels between the second and third ports while providing optical filtering of each second optical channel. In such a device optical frequencies of the second optical channels interleave with optical frequencies of the first optical channels so that each first optical channel is next to a second optical channel and is separated from another first optical channel by at least one second optical channel, and the first and second optical interleavers are optically coupled to one another to receive the first and second optical channels and to route the received first and second optical channels to transmit through each of the first and second optical interleavers before combining the first and second optical channels into a combined optical output in which the first and second optical channels are interleaved.

DETAILED DESCRIPTION

Figure 1:
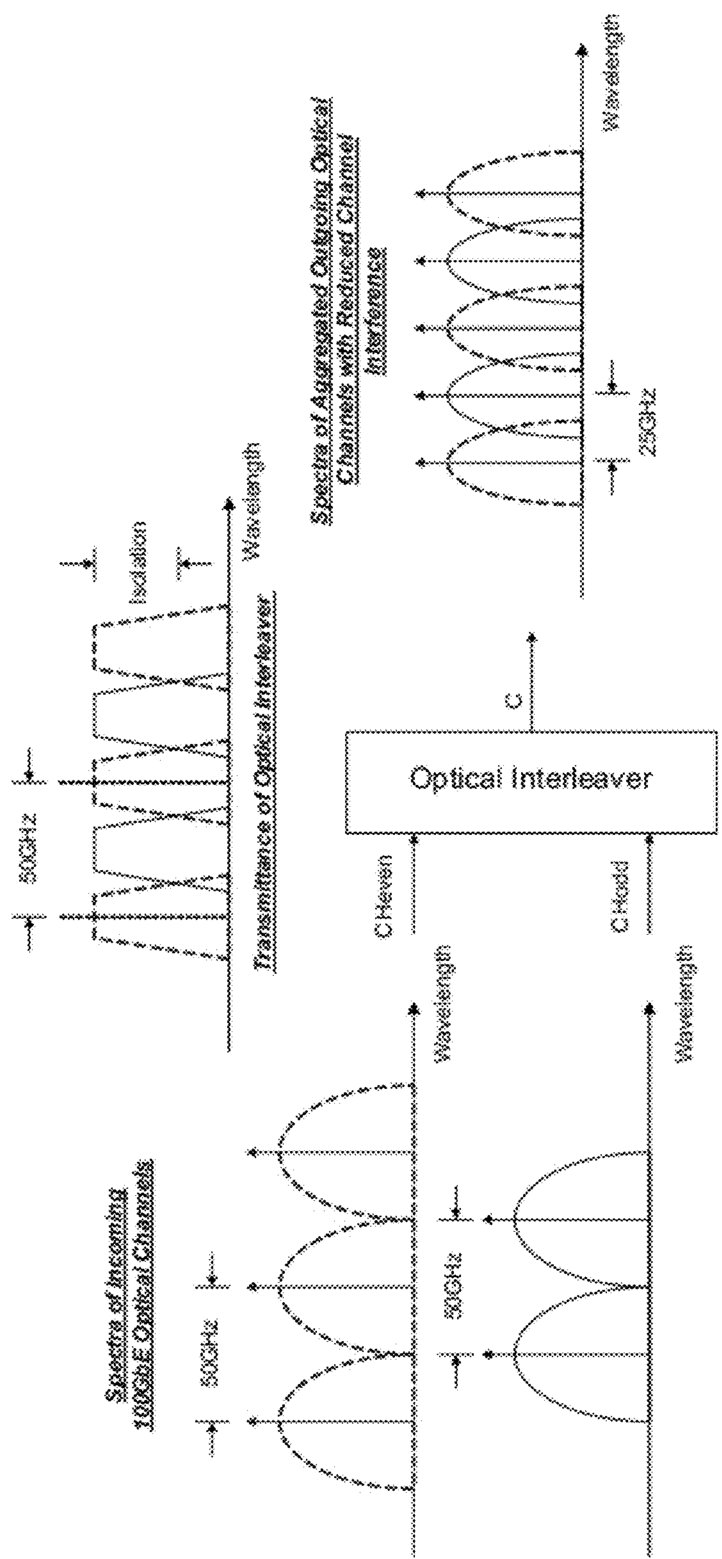
FIG. 1(A) illustrates the operations of an exemplary optical interleaver.
FIG. 1(B) is a block diagram of an exemplary optical interleaver.
Figure 1:
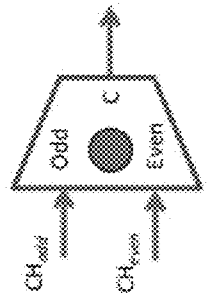

To facilitate the understanding of the underlying concepts, certain exemplary embodiments have been described in the context of optical communication systems that utilize wavelength division multiplexing (WDM). However, it is understood that the disclosed embodiments can be applied to optical communication systems that utilize techniques other than WDM.

To meet the high-bit rate demands needed for optical communication systems, some systems utilize a multi-carrier (multi-channel) approach using Nyquist wavelength division multiplexing (N-WDM). Using this approach, the communication link capacity can be expanded by grouping a number of, for example, 100 Gb DP-QPSK channels spaced at the symbol rate to yield a very high spectral efficiency. Using the Nyquist approach, the intersymbol interference (ISI) and intra-channel crosstalk is eliminated if the optical pulse used for transmitting information is a raised-cosine shaped pulse, which has a rectangular optical channel spectrum. While having such an ideal pulse shape may not be realizable in practice, optical filtering techniques can be utilized to produce approximations of such an ideal pulse shape.

Optical interleavers (ILs) can be successfully used for aggressive Nyquist WDM filtering operations. Optical interleavers have a flat WDM passband, which provide better high-frequency response as compared to other filters, such as Gaussian filters. Optical interleavers can be based multiple beam interference principles and use birefringent crystal network, step-wise Michaelson interferometers, and the like.

FIG. 1(A) illustrates an optical interleaver that can be used to improve network capacity. The interleaver of FIG. 1(A) includes two input ports that receive even (CHeven) and odd (CHodd) channels and one port (C) that can provide the interleaved output. As will be described in the sections that follow, any port of the interleaver can be used as either an input or an output port. The even channels that are input to the interleaver can represent the existing 100 Gb Ethernet optical channels, spaced apart at 50 GHz. The overall network capacity can be upgraded by inserting the odd channels while reducing the channel spacing to 25 GHz. Without utilizing such an interleaver, the interference between adjacent even and odd channels would be too high. However, as illustrated in FIG. 1(A), an optical interleaver with 25 GHz passband performs band limitation of all the even (existing) and odd (future) channels, thereby reducing the interference among odd and even channels. FIG. 1(A) also illustrates an exemplary transmittance characteristic of the optical interleaver. The dotted lines in the transmittance plot of the optical interleaver represent transmittance characteristics for the even channels, and the solid lines in the transmittance plot of the optical interleaver represent transmittance characteristics for the odd channels. FIG. 1(A) further depicts the spectra of the output optical channels that have been shaped in accordance with the spectral characteristics of the optical interleaver. The interleaved output includes even channels (dotted lines) and odd channels (solid lines) that are separated by 25 GHz.

FIG. 1(B) is a simplified diagram of an exemplary optical interleaver that can be used in accordance with the disclosed embodiments. The optical interleaver of FIG. 1 has two optical input/output ports on the left hand side, identified as $CH_{odd}$ and $CH_{even}$, and one optical common input/output on the right hand side, identified as C. While the exemplary diagram in FIG. 1(B) only shows a two-to-one optical interleaver, it is understood that the disclosed embodiments can be implemented using interleavers with additional input/out ports, such as a three-to-one and four-to-one interleaver. Moreover, the optical interleavers of the present application can be any optical interleaver that operates based on multiple beam interference principles.

Referring back to FIG. 1(B), in one configuration, the output of the interleaver in FIG. 1(B) is a single optical signal that comprises interleaved even and odd channels. Optical interleavers can also be used for de-interleaving purposes. When used as a de-interleaver, a composite optical signal is input through the common port on the right hand side, and the de-interleaved even and odd channels are output on the left hand side. As noted earlier, due to flat response of the optical interleavers in the WDM passband, these devices can be utilized for filtering of optical signals that are intended for communication using WDM techniques. For example, filtering of a set of even optical channels may be carried out by inputting the set of even channels through the even port of the optical interleaver and obtaining the filtered output even channels at the common port. Similarly, filtering of a set of even optical channels may be carried out by inputting the set of even channels through the common port and obtaining the filtered output at the even port. Since optical interleavers are passive devices, light can travel through the optical interleaver in either direction without a need for control signals. Moreover, odd and even optical channels can simultaneously propagate in opposite directions from one another through the optical interleaver.

The use of multiple optical interleavers can further reduce residual channel crosstalk between optical channels and enhance channel isolation. As such, one or more optical interleavers may be used in cascade to enhance the isolation of optical channels.

Figure 2:
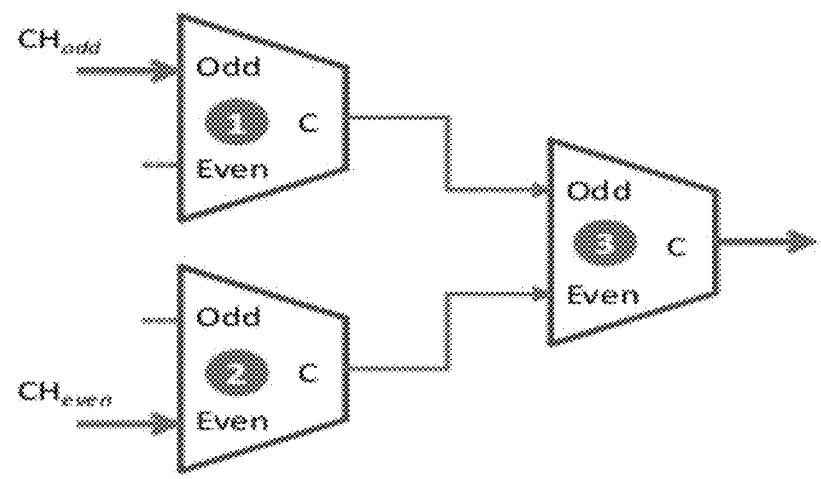
FIG. 2 is a block diagram of a two-stage optical interleaver.

FIG. 2 illustrates a block diagram of a Nyquist WDM filtering apparatus, which comprises three optical interleavers, labeled as Interleavers 1, 2 and 3, respectively. Each optical interleaver has one odd/even port for incoming/outgoing odd/even WDM channels, and one common port for the aggregated outgoing/incoming channels, respectively. As shown in FIG. 2, Interleaver-1 is used solely for the first-stage filtering (or interleaving) of the odd channel, $CH_{odd}$, whereas Interleaver-2 is used for first-stage filtering (or interleaving) of the even channel, $CH_{even}$. The outputs of Interleaver-1 and Interleaver-2 are then input to Interleaver-3, where the second-stage filtering (or interleaving) is carried out. Each of the odd and even channels that are illustrated in FIG. 2 are, therefore, filtered twice before appearing in the composite output of Interleaver-3. The double-stage interleaving of the even and odd channels that is illustrated in FIG. 2 uses three optical interleavers. Further, the even port of Interleaver-1 and the odd port of Interleaver-2 are not utilized.

Figure 3:
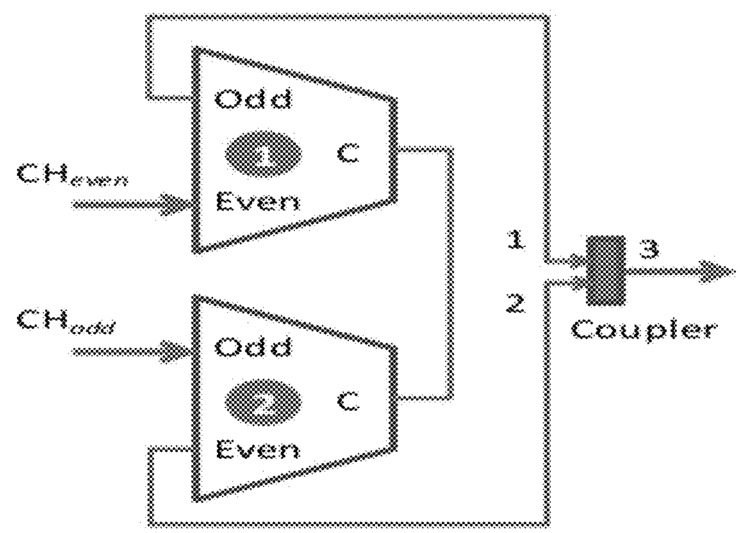
FIG. 3 is a block diagram of a multi-stage optical interleaver in accordance with an exemplary embodiment.

FIG. 3 illustrates a block diagram of multi-stage interleaver in accordance with an exemplary embodiment. The interleaver that is depicted in FIG. 3 includes two optical interleavers, Interleaver-1 and Interleaver-2, and one optical coupler. In one example, the optical coupler is a 50:50 coupler that has an output signal comprised of equal proportions of each of its input signals. The components that are illustrated in FIG. 3 can be conventional low-cost optical interleavers and optical couplers. The optical path for the odd channel that is input to the Interleaver-2 is as follows: Odd2 to C2 to C1 to Odd1 to Coupler1 and to Coupler3, where Coupler1 and Coupler3 represent input 1 of the coupler and output of the coupler, respectively. The optical path for the even channel that is input to the Interleaver-1 is as follows: Even1 to C1 to C2 to Even2 to Coupler2 and to Coupler3, where Coupler2 represents input 2 of the coupler.

The configuration that is illustrated in FIG. 3 achieves the same level of two-stage filtering as the configuration that is illustrated in FIG. 2 while using only two optical interleavers. Moreover, unlike the configuration in FIG. 2, in the configuration of FIG. 3 all optical ports of the interleavers are utilized. It should be noted that, for simplicity, individual ports of Interleaver-1 and Interleaver-2 of FIG. 3 are labeled as odd and even ports, with the even port of Interleaver-1 receiving the even channels and the odd port Interleaver-2 receiving the odd channels. However, it is understood that input and odd channels may be used interchangeably to be coupled to a first set of input channel and a second set of input channels.

Figure 4:
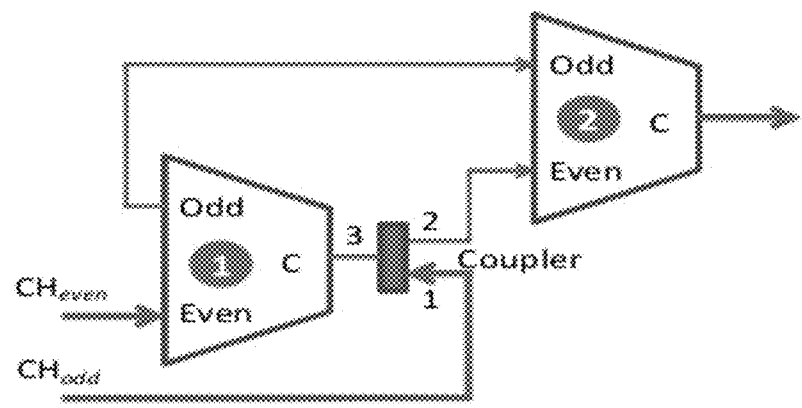
FIG. 4 is a block diagram of a multi-stage optical interleaver in accordance with another exemplary embodiment.

FIG. 4 illustrates a block diagram of an interleaver in accordance with another exemplary embodiment. The configuration in FIG. 4 also includes two optical interleavers, Interleaver-1 and Interleaver-2, in addition to an optical coupler. In one example, the optical coupler is a 50:50 coupler that has an output signal comprised of equal proportions of each of its input signals. The optical path for the odd channel that is input to the coupler is as follows: Coupler1 to Coupler3 to C1 to Odd1 to Odd2 and to C2. The optical path for the even channel that is input to Interleaver-1 is as follows: Even1 to C1 to Coupler3 to Coupler2 to Even2 and to C2. The configuration that is illustrated in FIG. 4 achieves the same level of two-stage filtering as the configuration that is illustrated in FIG. 2 while using only two optical interleavers. Moreover, unlike the configuration in FIG. 2, in the configuration of FIG. 4 each optical port is utilized. The coupler that is used in the configuration of FIG. 4 can be a wavelength-insensitive, 50/50 beam splitter/combiner. Similar to an optical interleaver, an optical coupler also has no directivity and allows simultaneous propagation of the even and odd optical channels through the coupler in opposite and/or same directions. Furthermore, the configuration of FIG. 4 can prevent unwanted propagation of residual light of a particular channel to the output of multi-stage interleaver. For example, any residual reflections of the even optical channels at the front surface of the coupler (i.e., at coupler 3) is blocked by Odd1 and will not propagate through the C1-to-Odd1 path.

Figure 5:
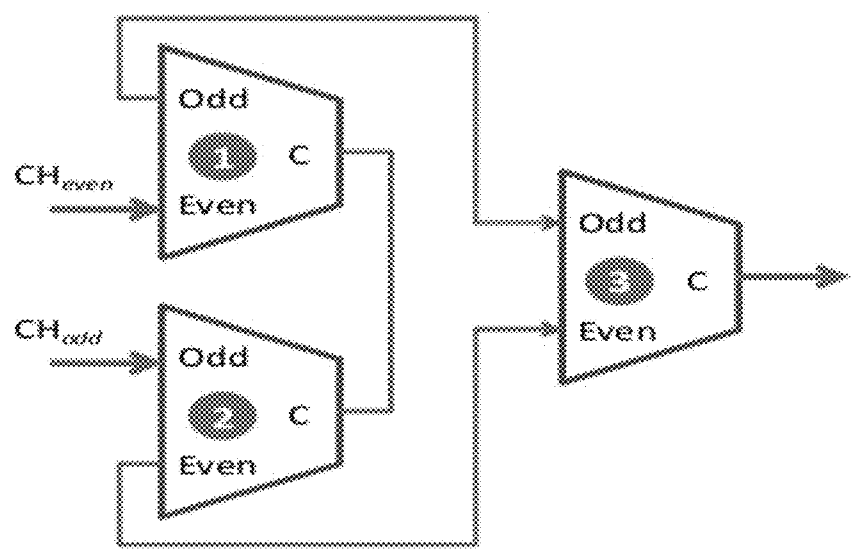
FIG. 5 is a block diagram of a multi-stage optical interleaver in accordance with another exemplary embodiment.

FIG. 5 illustrates a block diagram of an interleaver in accordance with another exemplary embodiment. The configuration in FIG. 5 utilizes three optical interleavers, Interleaver-1, Interleaver-2 and Interleaver-3. The optical path for the odd channel that is input to Interleaver-2 is as follows: Odd2 to C2 to C1 to Odd1 to Odd3 and to C3. The optical path for the even channel that is input to Interleaver-1 is as follows: Even1 to C1 to C2 to Even2 to Even3 and to C3. The configuration that is depicted in FIG. 5 uses the same number of optical interleavers as the configuration in FIG. 2 but provides an additional stage of filtering (i.e., third-stage filtering) for the input odd and even channels. The third-stage filtering provides better isolation between the odd and even WDM channels and, therefore, reduces ISI and enhances the OSNR for each channel.

Figure 6:
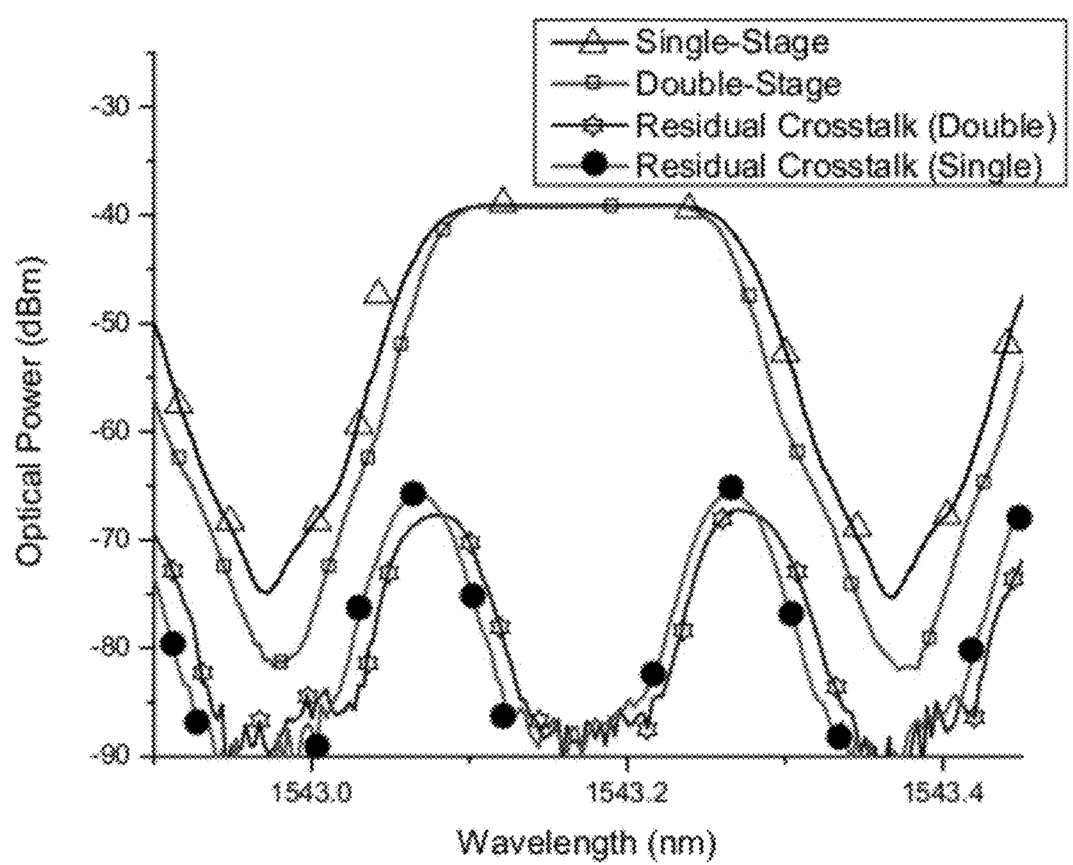
FIG. 6 illustrates the optical output power versus wavelength associated with single- and double-stage interleavers.

FIG. 6 is a plot of optical power (in dBm) as a function of wavelength (in nm) for an odd channel at the output of a single-stage optical interleaver (i.e., the interleaver configuration of FIG. 1) and a similar plot for the double-stage optical interleaver configuration of FIG. 3. The measured passband widths within 0.5 dB ripple are 19.51 and 18.04 GHz, for the single-stage and double-stage interleavers, respectively. As illustrated in FIG. 6, double-stage filtering results in sharper roll-off of optical power at the edge and outside of the passband.

FIG. 6 also includes a plot that illustrates residual crosstalk from the adjacent even channel when the double-stage filtering configuration of FIG. 3 is utilized, as well as a plot of residual crosstalk when single-stage filtering is used. Channel isolations at ITU±5 GHz are 25.27 dB and 32.33 dB for single-stage and double-stage interleavers, respectively. It is, therefore, evident that by using a double-stage interleaving configuration of the disclosed embodiments, the channel isolation can be enhanced by 7.06 dB. The double-stage interleaver configurations of FIG. 3 and FIG. 4 provide such an enhancement in channel isolation through the use of only two interleavers.

According to the disclosed embodiments, further improvements in channel isolation can be effectuated by utilizing the three-stage interleaving (or filtering) using the exemplary configuration of FIG. 5.

It should be understood that the foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. For instance, the exemplary embodiments have been described in the context of systems that utilize wavelength division multiplexing (WDM). However, it is understood that the disclosed embodiments can be used in any optical communication system that can benefit from the features of the disclosed embodiments. Theses features include, but are not limited to, a flat passband and small residual cross-talk from adjacent communication channels that are effectuated through cost-effective utilization of optical interleavers, couplers and other commonly available optical components.

Figure 7:
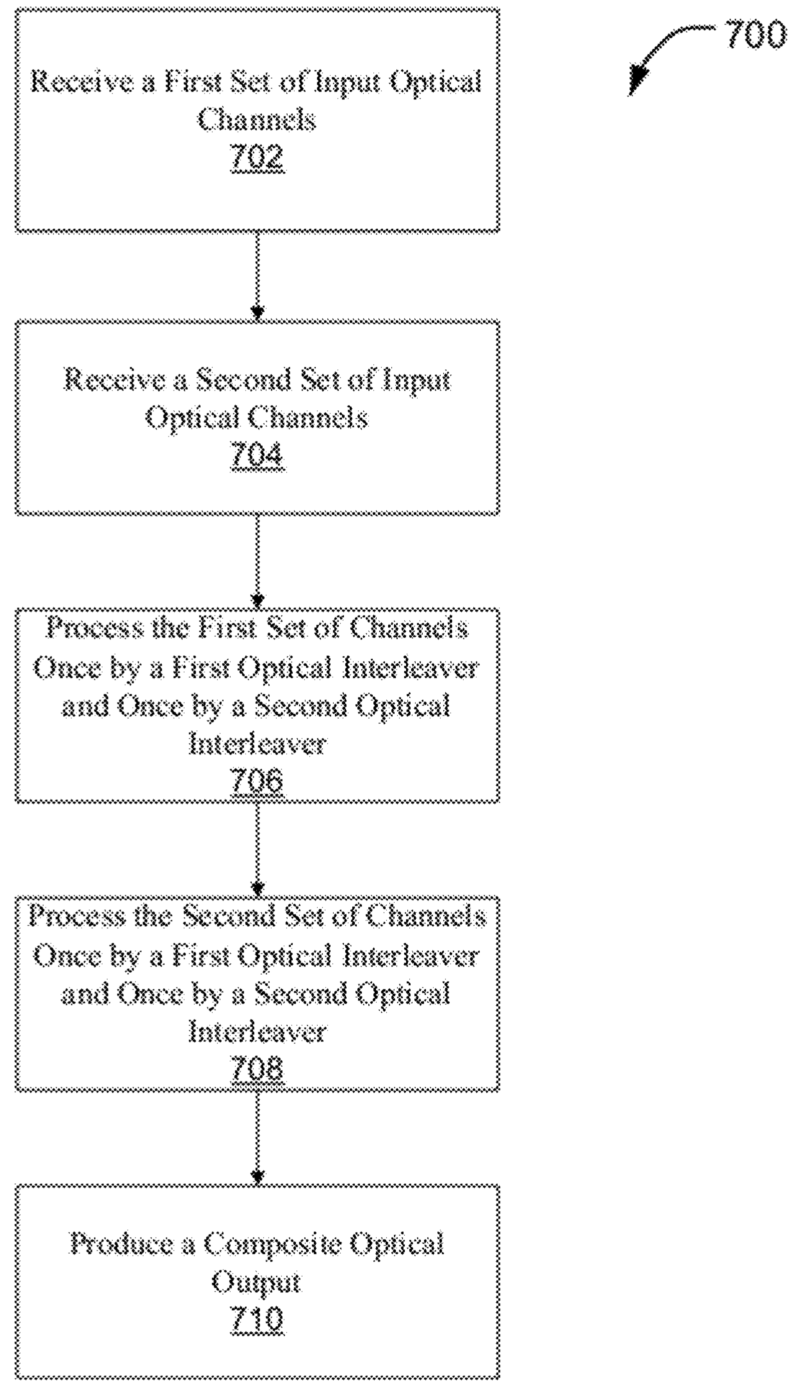
FIG. 7 illustrates a set of operations that are carried out to produce a composite optical output in accordance with an exemplary embodiment.

FIG. 7 illustrates a set of operations 700 that is carried out in accordance with an exemplary embodiment. A first set of input optical channels and a second set of optical input channels are received at 702 and 704, respectively. The input optical channels may, for example, comprise even and odd channels in a system that utilizes WDM. At 706, the first set of optical channels is processed once by a first optical interleaver and once by a second optical interleaver. At 708, the second set of optical channels is processed once by a first optical interleaver and once by a second optical interleaver. In some embodiments, the processing at 706 and 708 are carried out using the exemplary configurations that are illustrated in FIG. 3 and/or in FIG. 4. At 710, a composite optical output is produced. The composite optical output can, for example, comprise an interleaved output that includes the first and the second set of input optical channels.

In some embodiments, such as the ones that utilize the exemplary configurations of FIG. 3 or FIG. 4, a multi-stage optical interleaver is used that includes a first optical interleaver, having a first, a second and a third port. The multi-stage optical interleaver also includes a second optical interleaver, having a first, a second and a third port, as well as an optical coupler having a first port, a second port and a third port. In such embodiments, each of the first, second and the third ports of the first and the second optical interleavers and each of the first, second and third ports of the optical coupler can be configurable for use an input or an output port.

In some embodiments, producing the interleaved optical output comprises propagating the first set of optical channels through the multi-stage optical interleaver in accordance with an optical path that comprises a path from the second port of the first optical interleaver, to the third port of the first optical interleaver, to the third port of the second optical interleaver, to the second port of the second optical interleaver, to the second port of the optical coupler and to the third port of the optical coupler. In such embodiments, producing the interleaved optical output also includes propagating the second set of optical channels through the multi-stage optical interleaver in accordance with an optical path that comprises a path from the first port of the second optical interleaver, to the third port of the second optical interleaver, to the third port of the first optical interleaver, to the first port of the second optical interleaver, to the first port of the optical coupler and to the third port of the optical coupler.

In alternate embodiments, producing the interleaved optical output comprises propagating the first set of optical channels through the multi-stage optical interleaver in accordance with an optical path that comprises a path from the first port of the first optical interleaver, to the third port of the first optical interleaver, to the third port of the optical coupler, to the second port of the optical coupler, to the second port of the second optical interleaver and to the third port of the second optical interleaver. In such embodiments, producing the interleaved optical output also comprises propagating the second set of optical channels through the multi-stage optical interleaver in accordance with an optical path that comprises a path from the first port of the optical coupler to the third port of the optical coupler, to the third port of the first optical interleaver, to the first port of the first optical interleaver, to the first port of the second optical interleaver and to the third port of the second optical interleaver.

In some embodiments, the optical coupler that is used in the multi-stage interleaver is configured to produce a signal at the third port of the optical coupler that is comprised of equal proportions of signals at the first and second ports of the optical coupler.

Figure 8:
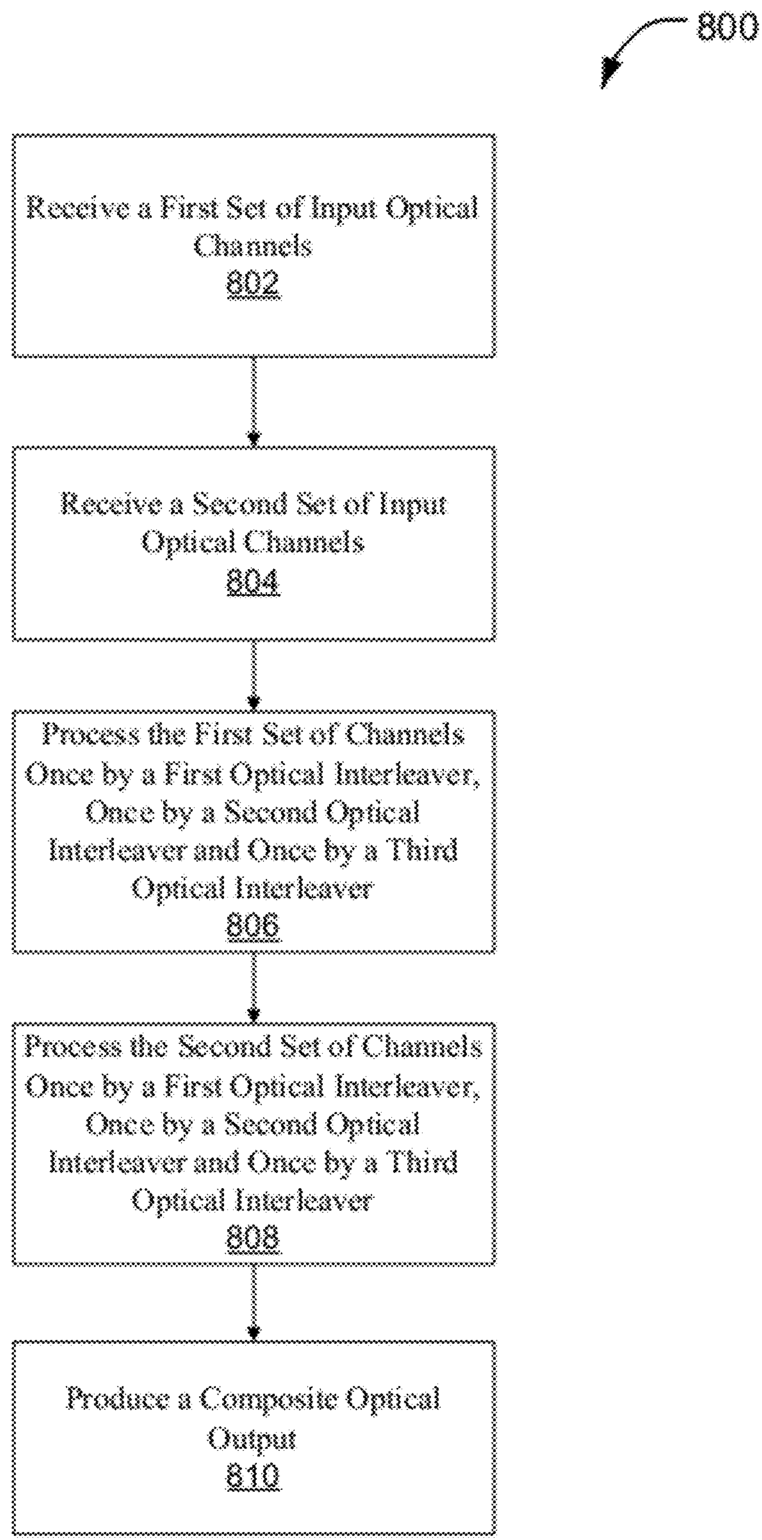
FIG. 8 illustrates a set of operations that are carried out to produce a composite optical output in accordance with another exemplary embodiment.

FIG. 8 illustrates another set of operations 800 that is carried out in accordance with an exemplary embodiment. A first set of input optical channels and a second set of optical input channels are received at 802 and 804, respectively. The input optical channels may, for example, comprise even and odd channels of a system that utilizes WDM. At 806, the first set of optical channels is processed once by a first optical interleaver, once by a second optical interleaver and once by a third optical interleaver. At 808, the second set of optical channels is processed once by a first optical interleaver, once by a second optical interleaver and once by a third optical interleaver. In some embodiments, the processing at 806 and 808 are carried out using the exemplary configuration that is illustrated in FIG. 5. At 810, a composite optical output is produced. The composite optical output can, for example, comprise an interleaved output that includes the first and the second set of input optical channels.

In some embodiments, producing the composite output comprises receiving a first set of input optical channels and a second set of input optical channels at a multi-state optical interleaver, wherein the multi-stage optical interleaver comprises propagating the first set of optical channels through a multi-stage optical interleaver in accordance with an optical path that comprises a path from the second port of the first optical interleaver, to the third port of the first optical interleaver, to the third port of the second optical interleaver, to the second port of the second optical interleaver, to the second port of the third optical interleaver and the third port of the third optical interleaver. In such embodiments, producing the composite output also includes propagating the second set of optical channels through the multi-stage optical interleaver in accordance with an optical path that comprises a path from the first port of the second optical interleaver, to the third port of the second optical interleaver, to the third port of the first optical interleaver, to the first port of the second optical interleaver, to the first port of the third optical interleaver and to the third port of the third optical interleaver.

It should be noted that the various exemplary operations that are illustrated in FIGS. 7 and 8 are described in a particular sequence in order to facilitate the understanding of the disclosed embodiments. It is understood, however, that one or more of the operations that are illustrated in each of FIGS. 7 and 8 may be eliminated and/or combined with other operations. Further, one or more of the operations that are illustrated in each of FIGS. 8 and 9 may be carried out in a different order than illustrated. Moreover, some of the operations that are illustrated in each of FIGS. 7 and 8 may be carried out simultaneously with one another rather than in a particular sequential order.

Another aspect of the disclosed embodiments relates to a device that includes a first optical interleaver, having a first, a second and a third port, and a second optical interleaver, which also has a first, a second and a third port. The device also comprises an optical coupler, with a first port, a second port. Such a device can be configured to receive a first set of input optical channels and a second set of input optical channels, and produce an composite optical output comprising the first set of input optical channels and the second set of input optical channels, where each of the first and second set of input optical channels is processed once by the first optical interleaver and once by the second optical interleaver.

Another aspect of the disclosed embodiments relates to a device that includes a first optical interleaver, having a first, a second and a third port, a second optical interleaver, having a first, a second and a third port, as well as a third optical interleaver having a first, a second and a third port. Such a device can be configured to receive a first set of input optical channels and a second set of input optical channels, and produce an composite optical output comprising the first set of input optical channels and the second set of input optical channels, where each of the first and second set of input optical channels is processed once by the first optical interleaver, once by the second optical interleaver and once by the third optical interleaver.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A device comprising:

a first optical interleaver, having a first, a second and a third port;

a second optical interleaver, having a first, a second and a third port; and an optical coupler having a first port, a second port and a third port, wherein the device is configured to:

receive a first set of input optical channels and a second set of input optical channels, and produce a composite optical output comprising the first set of input optical channels and the second set of input optical channels, wherein the first set of input optical channels are processed by the first optical interleaver and then processed by the second optical interleaver, and the second set of input optical channels are processed by the second optical interleaver and then processed by the first optical interleaver.

2. The device of claim 1, wherein each of the first, second and the third ports of the first and the second optical interleavers and each of the first, second and third ports of the optical coupler is configurable for use an input or an output port.

3. The device of claim 1, wherein:

an optical path associated with the first set of input optical channels comprises a path from the second port of the first optical interleaver, to the third port of the first optical interleaver, to the third port of the second optical interleaver, to the second port of the second optical interleaver, to the second port of the optical coupler and to the third port of the optical coupler; and an optical path associated with the second set of input optical channels comprises a path from the first port of the second optical interleaver, to the third port of the second optical interleaver, to the third port of the first optical interleaver, to the first port of the second optical interleaver, to the first port of the optical coupler and to the third port of the optical coupler.

4. The device of claim 1, wherein:

an optical path associated with the first set of input optical channels comprises a path from the first port of the first optical interleaver, to the third port of the first optical interleaver, to the third port of the optical coupler, to the second port of the optical coupler, to the second port of the second optical interleaver and to the third port of the second optical interleaver; and an optical path associated with the second set of input channels comprises a path from the first port of the optical coupler to the third port of the optical coupler, to the third port of the first optical interleaver, to the first port of the first optical interleaver, to the first port of the second optical interleaver and to the third port of the second optical interleaver.

5. The device of claim 1, wherein the optical coupler is configured to produce a signal at the third port of the optical coupler that is comprised of equal proportions of signals at the first and second ports of the optical coupler.

6. A device comprising:

a first optical interleaver, having a first, a second and a third port;

a second optical interleaver, having a first, a second and a third port; and a third optical interleaver, having a first, a second and a third port, wherein the device is configured to:

receive a first set of input optical channels and a second set of input optical channels, and produce a composite optical output comprising the first set of input optical channels and the second set of input optical channels, wherein the first set of input optical channels are processed by the first optical interleaver, then processed by the second optical interleaver, and further processed by the third optical interleaver, and the second set of input optical channels are processed by the second optical interleaver, then processed by the first optical interleaver, and further processed by the third optical interleaver.

7. The device of claim 6, wherein:

an optical path associated with the first set of input optical channels comprises a path from the second port of the first optical interleaver, to the third port of the first optical interleaver, to the third port of the second optical interleaver, to the second port of the second optical interleaver, to the second port of the third optical interleaver and the third port of the third optical interleaver; and an optical path associated with the second set of input optical channels comprises a path from the first port of the second optical interleaver, to the third port of the second optical interleaver, to the third port of the first optical interleaver, to the first port of the second optical interleaver, to the first port of the third optical interleaver and to the third port of the third optical interleaver.

8. A method comprising:

receiving a first set of input optical channels and a second set of input optical channels at a multi-state optical interleaver, wherein the multi-stage optical interleaver comprises:

a first optical interleaver, having a first, a second and a third port, a second optical interleaver, having a first, a second and a third port, and an optical coupler having a first port, a second port and a third port; and producing a composite optical output comprising the first set of input optical channels and the second set of input optical channels, wherein the first set of input optical channels are processed by the first optical interleaver and then processed by the second optical interleaver, and the second set of input optical channels are processed by the second optical interleaver and then processed by the first optical interleaver.

9. The method of claim 8, wherein each of the first, second and the third ports of the first and the second optical interleavers and each of the first, second and third ports of the optical coupler is configurable for use an input or an output port.

10. The method of claim 8, wherein producing the composite optical output comprises:

propagating the first set of optical channels through the multi-stage optical interleaver in accordance with an optical path that comprises a path from the second port of the first optical interleaver, to the third port of the first optical interleaver, to the third port of the second optical interleaver, to the second port of the second optical interleaver, to the second port of the optical coupler and to the third port of the optical coupler; and propagating the second set of optical channels through the multi-stage optical interleaver in accordance with an optical path that comprises a path from the first port of the second optical interleaver, to the third port of the second optical interleaver, to the third port of the first optical interleaver, to the first port of the second optical interleaver, to the first port of the optical coupler and to the third port of the optical coupler.

11. The method of claim 8, wherein producing the composite optical output comprises:

propagating the first set of optical channels through the multi-stage optical interleaver in accordance with an optical path that comprises a path from the first port of the first optical interleaver, to the third port of the first optical interleaver, to the third port of the optical coupler, to the second port of the optical coupler, to the second port of the second optical interleaver and to the third port of the second optical interleaver; and propagating the second set of optical channels through the multi-stage optical interleaver in accordance with an optical path that comprises a path from the first port of the optical coupler to the third port of the optical coupler, to the third port of the first optical interleaver, to the first port of the first optical interleaver, to the first port of the second optical interleaver and to the third port of the second optical interleaver.

12. The method of claim 8, wherein the optical coupler is configured to produce a signal at the third port of the optical coupler that is comprised of equal proportions of signals at the first and second ports of the optical coupler.

13. A method, comprising:

receiving a first set of input optical channels and a second set of input optical channels at a multi-state optical interleaver, wherein the multi-stage optical interleaver comprises:

a first optical interleaver, having a first, a second and a third port, a second optical interleaver, having a first, a second and a third port, and a third optical interleaver, having a first, a second and a third port; and producing a composite optical output comprising the first set of input optical channels and the second set of input optical channels, wherein the first set of input optical channels are processed by the first optical interleaver, then processed by the second optical interleaver, and further processed by the third optical interleaver, and the second set of input optical channels are processed by the second optical interleaver, then processed by the first optical interleaver, and further processed by the third optical interleaver.

14. The method of claim 13, wherein producing the composite optical output comprises:

propagating the first set of optical channels through the multi-stage optical interleaver in accordance with an optical path that comprises a path from the second port of the first optical interleaver, to the third port of the first optical interleaver, to the third port of the second optical interleaver, to the second port of the second optical interleaver, to the second port of the third optical interleaver and the third port of the third optical interleaver; and propagating the second set of optical channels through the multi-stage optical interleaver in accordance with an optical path that comprises a path from the first port of the second optical interleaver, to the third port of the second optical interleaver, to the third port of the first optical interleaver, to the first port of the second optical interleaver, to the first port of the third optical interleaver and to the third port of the third optical interleaver.

15. A device for interleaving different optical channels at different optical wavelengths, comprising:

a first optical interleaver, having a first, a second and a third port, to route a set of first optical channels between the first and third ports while providing optical filtering of each first optical channel; and a second optical interleaver, having a first, a second and a third port, to route a set of second optical channels between the second and third ports while providing optical filtering of each second optical channel, optical frequencies of the second optical channels interleaving with optical frequencies of the first optical channels so that each first optical channel is next to a second optical channel and is separated from another first optical channel by at least one second optical channel, and the first and second optical interleavers optically coupled to one another to receive the first and second optical channels and to route the received first and second optical channels to transmit through each of the first and second optical interleavers before combining the first and second optical channels into a combined optical output in which the first and second optical channels are interleaved.

16. A device comprising:

a first optical interleaver, having a first, a second and a third port;

a second optical interleaver, having a first, a second and a third port; and an optical coupler having a first port, a second port and a third port, wherein the device is configured to:

receive a first set of input optical channels and a second set of input optical channels, and produce a composite optical output comprising the first set of input optical channels and the second set of input optical channels, wherein:

an optical path associated with the first set of input optical channels comprises a path from the second port of the first optical interleaver, to the third port of the first optical interleaver, to the third port of the second optical interleaver, to the second port of the second optical interleaver, to the second port of the optical coupler and to the third port of the optical coupler; and an optical path associated with the second set of input optical channels comprises a path from the first port of the second optical interleaver, to the third port of the second optical interleaver, to the third port of the first optical interleaver, to the first port of the second optical interleaver, to the first port of the optical coupler and to the third port of the optical coupler.

17. The device of claim 16, wherein the optical coupler is configured to produce a signal at the third port of the optical coupler that is comprised of equal proportions of signals at the first and second ports of the optical coupler.

18. A device comprising:

a first optical interleaver, having a first, a second and a third port;

a second optical interleaver, having a first, a second and a third port; and an optical coupler having a first port, a second port and a third port, wherein the device is configured to:

receive a first set of input optical channels and a second set of input optical channels, and produce a composite optical output comprising the first set of input optical channels and the second set of input optical channels, wherein:

an optical path associated with the first set of input optical channels comprises a path from the first port of the first optical interleaver, to the third port of the first optical interleaver, to the third port of the optical coupler, to the second port of the optical coupler, to the second port of the second optical interleaver and to the third port of the second optical interleaver; and an optical path associated with the second set of input channels comprises a path from the first port of the optical coupler to the third port of the optical coupler, to the third port of the first optical interleaver, to the first port of the first optical interleaver, to the first port of the second optical interleaver and to the third port of the second optical interleaver.

19. The device of claim 18, wherein the optical coupler is configured to produce a signal at the third port of the optical coupler that is comprised of equal proportions of signals at the first and second ports of the optical coupler.

20. A device comprising:

a first optical interleaver, having a first, a second and a third port;

a second optical interleaver, having a first, a second and a third port; and a third optical interleaver, having a first, a second and a third port, wherein the device is configured to:

receive a first set of input optical channels and a second set of input optical channels, and produce a composite optical output comprising the first set of input optical channels and the second set of input optical channels, wherein:

an optical path associated with the first set of input optical channels comprises a path from the second port of the first optical interleaver, to the third port of the first optical interleaver, to the third port of the second optical interleaver, to the second port of the second optical interleaver, to the second port of the third optical interleaver and the third port of the third optical interleaver; and an optical path associated with the second set of input optical channels comprises a path from the first port of the second optical interleaver, to the third port of the second optical interleaver, to the third port of the first optical interleaver, to the first port of the second optical interleaver, to the first port of the third optical interleaver and to the third port of the third optical interleaver.

21. A method comprising:

receiving a first set of input optical channels and a second set of input optical channels at a multi-state optical interleaver, wherein the multi-stage optical interleaver comprises:

a first optical interleaver, having a first, a second and a third port, a second optical interleaver, having a first, a second and a third port, and an optical coupler having a first port, a second port and a third port; and producing a composite optical output comprising the first set of input optical channels and the second set of input optical channels, wherein producing the composite optical output comprises:

propagating the first set of optical channels through the multi-stage optical interleaver in accordance with an optical path that comprises a path from the second port of the first optical interleaver, to the third port of the first optical interleaver, to the third port of the second optical interleaver, to the second port of the second optical interleaver, to the second port of the optical coupler and to the third port of the optical coupler; and propagating the second set of optical channels through the multi-stage optical interleaver in accordance with an optical path that comprises a path from the first port of the second optical interleaver, to the third port of the second optical interleaver, to the third port of the first optical interleaver, to the first port of the second optical interleaver, to the first port of the optical coupler and to the third port of the optical coupler.

22. The method of claim 21, wherein each of the first, second and the third ports of the first and the second optical interleavers and each of the first, second and third ports of the optical coupler is configurable for use an input or an output port.

23. A method comprising:

receiving a first set of input optical channels and a second set of input optical channels at a multi-state optical interleaver, wherein the multi-stage optical interleaver comprises:

a first optical interleaver, having a first, a second and a third port, a second optical interleaver, having a first, a second and a third port, and an optical coupler having a first port, a second port and a third port; and producing a composite optical output comprising the first set of input optical channels and the second set of input optical channels, wherein producing the composite optical output comprises:

propagating the first set of optical channels through the multi-stage optical interleaver in accordance with an optical path that comprises a path from the first port of the first optical interleaver, to the third port of the first optical interleaver, to the third port of the optical coupler, to the second port of the optical coupler, to the second port of the second optical interleaver and to the third port of the second optical interleaver; and propagating the second set of optical channels through the multi-stage optical interleaver in accordance with an optical path that comprises a path from the first port of the optical coupler to the third port of the optical coupler, to the third port of the first optical interleaver, to the first port of the first optical interleaver, to the first port of the second optical interleaver and to the third port of the second optical interleaver.

24. The method of claim 23, wherein each of the first, second and the third ports of the first and the second optical interleavers and each of the first, second and third ports of the optical coupler is configurable for use an input or an output port.

25. A method, comprising:

receiving a first set of input optical channels and a second set of input optical channels at a multi-state optical interleaver, wherein the multi-stage optical interleaver comprises:

a first optical interleaver, having a first, a second and a third port, a second optical interleaver, having a first, a second and a third port, and a third optical interleaver, having a first, a second and a third port; and producing a composite optical output comprising the first set of input optical channels and the second set of input optical channels, wherein producing the composite optical output comprises:

propagating the first set of optical channels through the multi-stage optical interleaver in accordance with an optical path that comprises a path from the second port of the first optical interleaver, to the third port of the first optical interleaver, to the third port of the second optical interleaver, to the second port of the second optical interleaver, to the second port of the third optical interleaver and the third port of the third optical interleaver; and propagating the second set of optical channels through the multi-stage optical interleaver in accordance with an optical path that comprises a path from the first port of the second optical interleaver, to the third port of the second optical interleaver, to the third port of the first optical interleaver, to the first port of the second optical interleaver, to the first port of the third optical interleaver and to the third port of the third optical interleaver.

* * * * *